United States Patent [19]

Shkondin

[11] Patent Number: 5,164,623
[45] Date of Patent: Nov. 17, 1992

[54] INDEPENDENT-DRIVE WHEEL FOR A WHEEL-MOUNTED VEHICLE

[76] Inventor: Vasily V. Shkondin, prospekt Vernadskogo, 93, korpus 1, kv. 159, Moscow, U.S.S.R.

[21] Appl. No.: 678,268
[22] PCT Filed: Aug. 24, 1990
[86] PCT No.: PCT/SU90/00209
§ 371 Date: Apr. 23, 1991
§ 102(e) Date: Apr. 23, 1991
[87] PCT Pub. No.: WO91/03385
PCT Pub. Date: Mar. 21, 1991

[30] Foreign Application Priority Data

Sep. 1, 1989 [SE] Sweden .................... 4731991

[51] Int. Cl.[5] ............ H02K 11/00; H02K 13/00; H02K 7/14; H02K 3/18
[52] U.S. Cl. ............ 310/67 R; 310/68 R; 310/148; 310/180
[58] Field of Search .......... 105/53; 180/65.5; 310/67 R, 49 R, 68 R, 148, 140, 179, 180, 185, 269

[56] References Cited

U.S. PATENT DOCUMENTS

| 433,180 | 7/1890 | Parcelle | 310/67 R |
|---|---|---|---|
| 643,854 | 2/1990 | Whittlesey | 180/65.5 |
| 2,335,398 | 11/1943 | Downey | 310/67 R |
| 2,441,801 | 5/1948 | Dever | 310/67 R |
| 3,566,165 | 2/1971 | Lohr | 310/67 R |
| 4,315,171 | 2/1982 | Schaeffer | 310/49 R |
| 4,355,249 | 10/1982 | Kenwell | 310/49 R |
| 4,754,207 | 6/1988 | Heidelberg et al. | 310/198 |

FOREIGN PATENT DOCUMENTS

| 2416810 | 9/1979 | France . | |
|---|---|---|---|
| 375214 | 5/1973 | U.S.S.R. . | |
| 628008 | 9/1978 | U.S.S.R. . | |
| 1050920 | 10/1983 | U.S.S.R. . | |
| 1284853 | 1/1987 | U.S.S.R. . | |
| 1357257 | 12/1987 | U.S.S.R. . | |
| 1384420 | 3/1988 | U.S.S.R. . | |
| 1231782 | 5/1971 | United Kingdom | 180/65.5 |
| 1248494 | 10/1971 | United Kingdom . | |
| 1414134 | 11/1975 | United Kingdom . | |
| 1463500 | 2/1977 | United Kingdom . | |
| 2123362 | 2/1984 | United Kingdom . | |

Primary Examiner—Steven L. Stephan
Assistant Examiner—C. LaBalle
Attorney, Agent, or Firm—Burgess, Ryan & Wayne

[57] ABSTRACT

An independent-drive wheel for electric cars, bicycles, and wheelchairs wherein electromagnets 14,15 of rotor 12 of a commutator motor are positioned along a circumference in the form of a pair of groups which are offset with respect to each other, and wherein distribution commutator 6 of stator 9 electrically connected to electric energy storage device 32 is constructed in such a manner that when magnetic axes 17,18 of electromagnets of one group and magnetic members 11 of the stator are aligned, electromagnets 14 are connected to electric energy storage device 32, and when magnetic axes 19,18 of electromagnets 15 of the second group and of respective magnetic members 11 of stator 9 are not aligned, these electromagnets 15 are connected to voltage control unit 36.

23 Claims, 9 Drawing Sheets

INDEPENDENT-DRIVE WHEEL FOR A WHEEL-MOUNTED VEHICLE

FIELD OF THE INVENTION

The invention relates to prime movers of vehicle, and more specifically, it deals with an independent-drive wheel for a wheel-mounted vehicle which can be used as an independent-drive wheel for electric bicycles, wheelchairs, shop material handling vehicles, electric cars, electric tractors and electric forklifts, electric buses, various electric trolleys and carriages, and the like.

BACKGROUND OF THE INVENTION

Prior art independent-drive wheels are in the form of a combination of a motor from which torque is mechanically transmitted through a reduction gear or a shaft to a wheel.

Also known in the art are independent-drive wheels which do not have a mechanical transmission, e.g., hydraulic independent-drive wheels (SU, A, 1357257) or air-powered independent-drive wheels (SU, A, 1050920).

The most promising are independent-drive wheels in which rotation is imparted to a wheel be means of an electromagnetic gearless cooperation of magnetic systems of a stator and rotor (SU, A, 628008).

Independent-drive wheels may also be used in which a prime mover is in the form of an internal combustion engine. However, the use of this prime mover is not only ineffective in view of the use of a fuel and the need to have auxiliary lubrication and cooling systems, and because of a large size, but also because of undesirable polution of the environment.

Most widespread used are independent-drive wheels having a reduction gear and an induction motor which have high speeds to result in a gain in power. In comparison with internal combustion engines, these independent-drive wheels are ecologically safe, more reliable and economical.

However, the use of a reduction gear brings about an increased risk and hampers operation, and the employment of an induction motor calls for the provision of sophisticated voltage converter units and control units as well as auxiliary lubrication and cooling systems.

In addition, it is not possible to ensure recuperation of energy during movement; storage battery life is short, and high-voltage power supplies have to be used. All this do not allow geared independent-drive wheels powered by an induction motor to be regarded as promising for the future.

Known in the art independent-drive wheels having a d-c motor which transmits torque (SU, A, 375214). The d-c motor has a hollow flexible cylindrical rotor having a ring gear engageable with a gear having its axle which is the wheel axle.

The main disadvantage is the need for a large energy consumption and motor power (especially at starting of a vehicle), large size and heavy weight.

The most similar to the invention is an independent-drive wheel of a wheel-mounted vehicle, comprising a wheel having a rim and a shaft incorporating an induction motor (SU, A, 1628008). The electric motor is in the form of a disk-type induction machine having its stator with a magnetic circuit, windings and current leads secured to a fixed axle of the wheel and a squirrel-cage rotor having a winding and magnetic circuits positioned on either side of the stator to form a wheel which is rotatable with respect to the stator. The rotor carries a rim which is provided with a pneumatic tire or other device.

The motor disks are made of an electrically conducting material, and short-circuit conductors of the rotor winding terminating in end portions of magnetic circuits through which the axial magnetic flux is closed.

Radially extending vanes for intensifying heat removal from the disk surface and increasing load-bearing capacity of the wheel are externally provided on the outer side of the rotor disks.

This construction of the independent-drive wheel ensures an enhanced reliability owing to the absence of a mechanical gear and enhances stator and rotor cooling through radial passages of the stator washed with a coolant and communicating with inlet and outlet pipes provided in the fixed axle and through radial interior spaces of the rotor.

The prior art independent-drive wheel, which makes use of an induction motor, has a low reliability in operation, high heat emission as a result of a residual field in the magnetic system of the electric motor because of counter-emf, and poor controllability because of the absence of a link between dynamics of rotation and control signals.

In addition, the prior art independent-drive wheel has a sophisticated control system, makes use of high-voltage power supplies having a short life in a voltage control unit, and cannot work with energy recuperation during movement and braking of a vehicle.

This independent-drive wheel is not ecologically safe to a sufficient extent; it is difficult in maintenance and inspection, rather unsafe and expensive because of the use of high-voltage power supplies.

In view of the above, the main problem arising in the development of independent-drive wheels for wheel-mounted vehicles such as electric cars, electric forklifts, electric tractors, electric bicycles, wheelchairs, and the like, is the problem of the provision and development of a special electric machine which is to comply with the following basic requirements:

possibility of incorporation in a vehicle wheel without the use of a gear;
use of low-voltage electrical power supplies;
maximum simplicity, low weight and compactness;
enhanced reliability and long service life;
maximum torque at starting of a vehicle and torque reduction with an increase in the wheel speed;
absence of auxiliary cooling and lubrication systems;
optimum thermal conditions;
counter-emp energy recuperation;
facilitated control of independent-drive wheels and possibility of maneuvering within restricted areas.

SUMMARY OF THE INVENTION

In view of the above, the invention is based on the problem of providing a very simple and reliable independent-drive wheel of a wheel-mounted vehicle in which, owing to a new construction and relative position of components of electromagnetic cooperation between the rotor and stator, use is made of low-voltage (mainly 50 V) power supplies ensuring a maximum torgue at starting of a vehicle and in which no auxiliary cooling systems are used.

This is accomplished by the fact that in an independent-drive wheel of a wheel-mounted vehicle, comprising a rim, an axle, an electric drive having an electric motor, and voltage control unit, a stator of the electric motor rigidly secured to the axle, having a stator magnetic circuit on which an even number of magnetic members of the stator of alternating polarity are equally spaced along a circumference, and a rotor of the electric motor having a rotor magnetic circuit mounted on the wheel axle for rotation with respect to the stator and carrying a rim, with windings mounted on the magnetic circuit of the rotor, according to the invention, the magnetic circuit of the rotor having the winding is made salient electromagnets facing towards the magnetic members of the stator and spaced along a circumference in the form of at least two groups, the electromagnets of the rotor in each group being positioned in such a manner that their axes are spaced from each other at a distance multiple of the distance between the axes of two adjacent magnetic members of the stator, two randomly chosen adjacent electromagnets of one group being of opposite polarities, provided that the distance between their axes is equal to an odd number of times the distance between the axes of adjacent magnetic members of the stator, and being of identical polarity, provided the distance between their axes is equal to an even number of times the distance between adjacent magnetic members of the stator. The groups of electromagnets of the rotor are angularly offset with respect to one another in such a manner that of the axes of the rotor electromagnets of one group are aligned with the axes of respective magnetic members of the stator, there is no such alignment between the magnetic axes of electromagnets of other groups and respective magnetic elements of the stator. The electromagnets of the rotor within each group are electrically connected to members of an individual current collector rigidly secured to the rotor. The current collector members are engageable with a distribution commutator which is electrically couples to a voltage control unit secured to the stator and constructed in such a manner that when the axes of electromagnets of any one group are aligned with the axes of respective magnetic members of the stator, the electromagnets of this group are disconnected from the voltage control unit.

The distribution commutator may be formed by equally circumferentially spaced and radially insulated conducting plates of unlike polarity the number of which is equal to the number of the magnetic members of the stator. The distance between any two adjacent plates of unlike polarity is larger than the width of the current collector member. Every second plate of unlike polarity is connected to a respective lead of the voltage control unit and, when the axes of electromagnets of any one group are aligned with the axes of respective magnetic members of the stator, the current collector members of this groups are positioned intermediate between respective unlike polarity plates, and when the axes of electromagnets of any group are positioned intermediate between the axes of respective magnetic members of the stator, the axes of the current collector members of this groups are aligned with the axes of respective unlike polarity plates connected to different leads of the voltage control unit.

To increase power by increasing the space of electromagnetic cooperation, the electromagnets of the rotor within each group may be aqually spaced in such a manner that the distance between the axes of adjacent electromagnets is equal to the distance between the axes of adjacent magnetic members of the stator, the electromagnets of each group being of alternating polarity.

For recuperation of electric energy, electric energy storage is provided which is electrically coupled to the distribution commutator. The distribution commutator is made in such a manner that when the axes of the electric motors of one group are aligned with the axes of the magnetic members of the stator, these electromagnets are disconnected from the voltage control unit and are connected to the electric energy storage device. If the axes of the electromagnets of any group are not aligned with the axes of the magnetic members of the stator, the electromagnets are connected to the voltage control unit and are disconnected from the electric energy storage device.

The electric energy storage device is electrically coupled to the distribution commutator which is formed by equally spaced and radially insulated conducting plates of unlike polarity the number of which is equal to the number of the magnetic members of the stator. An intermediate plate is provided between alternating plates of unlike polarity which are connected to different leads of the voltage control unit. The intermediate plates are alternately connected to different leads of the electric energy storage device, and the distance between any two adjacent plates of unlike polarity is greater than the width of the current collector members. When the axes of the electromagnets of any one group are aligned with the axes of respective magnetic members of the stator, the current collector members of this group of the electromagnets of the rotor are positioned opposite to the centerlines of respective intermediate plates connected to different leads of the electric energy storage device, and when the axes of the electromagnets of any one group are positioned intermediate between the axes of respective magnetic members of the stator, the axes of the current collector members of this group are aligned with the axes of respective plates of unlike polarity connected to different leads of the voltage control unit.

The provision of the electric energy storage device electrically coupled, via the distribution commutator and the current collector, to the rotor electromagnets allows a part of energy to be returned to the electric energy storage device from the rotor electromagnets each time the electromagnets are in front of the magnetic members of the stator. In addition to energy recuperation, the residual magnetization of the rotor magnetic circuit is eliminated. The energy returned to the energy storage device is determined, first, by the counter-emf caused by the disconnection of the voltage control unit, and second, by a change in magnetic flux determined by the magnetic members of the stator in the electromagnet core. At the same time, the elimination of the residual magnetic intensity in the electromagnet cores results in a decrease in heat release and energy consumption.

The rotor of the electric motor may be in the form of at least one ring having magnetic circuits which are externally provided with a wheel rim, the groups of the electromagnets of the rotor being positioned on the inner surface of the magnetic circuits of the rotor. The stator is made in the form of at least one disk and with an annular magnetic circuit mounted on the periphery of each disk and having the magnetic members of the stator on the outer surface thereof, the axes of the electromagnets of the rotor and of the magnetic members of the stator extending in the radial direction.

This construction allows power of the independent-drive wheel to be increased owing to an increase in the space for electromagnetic interaction.

An embodiment of an independent-drive wheel, which features simplicity and reliability and which facilitates operation, is a disk-type construction that can be used in light-weight vehicles.

With the rotor in the form of at least one disk mounted on the axle of the wheel on one side of the stator, which is made in the form of a disk, the magnetic members of the stator are positioned on one side of the stator disk in such a manner that their magnetic axes extends in parallel with the wheel axle, and with the stator in the form of two disks mounted on the wheel axle on either side of the stator, at least one group of electromagnets are positioned on each of the disks.

The rotor of the electric motor may be in the form of two disks mounted on the wheel axle on either side of the stator which comprises a disk having circumferentially spaced magnetic members of the stator mounted on either side thereof in such a manner that their magnetic axes extend in parallel with the wheel axle. The stator is provided with an auxiliary distribution commutator which is constructed, positioned and electrically coupled identically with the main distribution commutator. Each disk of the rotor has at least one group of electromagnets. Current collector members of one disk of the rotor are mounted for electric contact with the distribution commutator, and current collector members of the other disk of the rotor are mounted for electric contact with the auxiliary distribution commutator.

This construction allows traction power of the independent-drive wheel to be increased owing to a two-times increase in the space for electromagnetic interaction between rotor and stator members, but only one disk of the stator is used for carrying magnetic circuits of the stator so as to reduce metal usage and weight of the independent-drive wheel.

The rotor may be in the form of at least two rings, each ring carrying at least one group of electromagnets and auxiliary current collectors corresponding to these groups which are similar to the main current collectors and which are rigidly secured to a respective ring of the rotor. Each auxiliary current connector may be mounted in such a manner that its members be engageable with the distribution commutator.

The independent-drive wheel may have at least one auxiliary distribution commutator which is constructed, positioned and electrically coupled similarly to the main distribution commutator. The auxiliary current collectors are mounted in such a manner that their members be engageable with one of the auxiliary distribution commutator.

The three latter embodiments of the independent-drive wheel are characterized by the provision of a plurality of rotors (rotor rings and rotor magnetic circuits). This facility allows the motor power to be increased by increasing the space of electromagnetic interaction between the rotor and stator.

To increase the space for electromagnetic interaction between the rotor and stator, an embodiment may be used with a plurality of stators, comprising at least one auxiliary distribution commutator which is constructed and electrically coupled similarly to the distribution commutator. The stator is made in the form of at least two coaxial disks, the auxiliary distribution commutators being positioned on the lateral sides of respective disks of the stator, and the auxiliary current collector members are mounted for electric contact with respective auxiliary distribution commutators.

The magnetic members provided on either side of the stator disk facing towards the rotor disks may be in the form of an even number of electromagnets of the stator with alternating magnetic poles. Each commutator is provided with auxiliary intermediate conducting plates of unlike polarity similar to the main intermediate plates of unlike polarity, insulated therefrom and similarly spaced along a circumference of a different diameter. Each respective current collector member is provided with an auxiliary current collector member electrically couples to a respective main current collector member and positioned with respect to the auxiliary conducting plates similarly to the manner in which main current collector member is positioned with respect to the main conducting plates. The auxiliary plates of unlike polarity are connected to each other pairwise, and each of alternating pairs of the auxiliary plates of unlike polarity is electrically connected to a respective lead of the electromagnets of the stator. The main plates of unlike polarity are divided into pairs formed by adjacent plates of unlike polarity which are electrically connected to each other, and each of the alternating pairs of the main plates of unlike polarity is electrically connected to a respective lead of the voltage control unit, each disk of the rotor having a respective one group of the electromagnets of the rotor.

This embodiment is characterized by high traction performance, increased speed and inertia because of the absence of magnetic fluxes in the electromagnets of the rotor when they are in front of the magnetic members of the stator (electromagnets).

The magnetic members of the stator are preferably in the form of permanent magnets. It is possible, in this case, if the above-described disk-type construction is used, that permanent magnets be mounted on either side of the stator disk. This construction of the independent-drive wheel is characterized by simplicity in use and reliability in operation and is capable of generating energy when the power supply is disconnected. In addition, this embodiment does not call for special braking since rotor electromagnet cores are attached by the stator magnets when the electromagnets are deenergized and tend to take s steadily fixed position.

To increase rotor speed (with a certain reduction of torque), equally spaced grooves can be made along the periphery of a non-magnetically conducting disk of the stator, and alternating permanent magnets with oppositely directed axes of magnetic flux running in parallel with the wheel axle can be mounted in these grooves.

To enhance power and reduce magnetic material usage, it is preferred that permanent magnets be provided in the former embodiments, which are mounted along the periphery of the disk of the stator, with the magnetic flux being directed tangentially with respect to the circumference of the disk, concentrators of magnetic flux being provided between the permanent magnets.

Any distribution commutator may be mounted for an angular movement with respect to the stator axis. This facilitates setup of the independent-drive wheel to compensate for changes in properties of materials or in the construction during a prolonged operation period.

Idle plates, which are connected neither to the voltage control unit nor to the electric energy storage device, can be provided between any plates of unlike polarity and any intermediate plates. This construction allows leakage current to be lowered so as to make the system more economical, but this can bring about sparking in certain applications.

In certain applications, when high-speed or fast-response independent-drive wheels have to be provided, it is preferred that the groups of electromagnets by divided into subgroups mounted on different parts of the rotor, e.g., in diametrically opposed positions.

The intermediate plates are preferably connected, in the majority of applications, to the electric energy storage device through a rectifier converter so as to enhance conditions for charging the electric energy storage device.

If the independent-drive wheel is provided with a switch for connecting two channels to one, the leads of the voltage control unit being connected to first inputs of the switch having its outputs connected to the plates of the distribution commutator and/or of the auxiliary distribution commutator of unlike polarity, respectively, and second inputs are connected, via a rectifier converter, to inputs of the voltage control unit, or electric energy storage device, or auxiliary electric energy storage device, an additional recuperation of energy during braking can be achieved.

DESCRIPTION OF THE DRAWINGS

The invention will now be described with reference to specific embodiments illustrated in the accompanying drawings, in which.

DETAILED DESCRIPTION OF THE INVENTION

Figure 1:
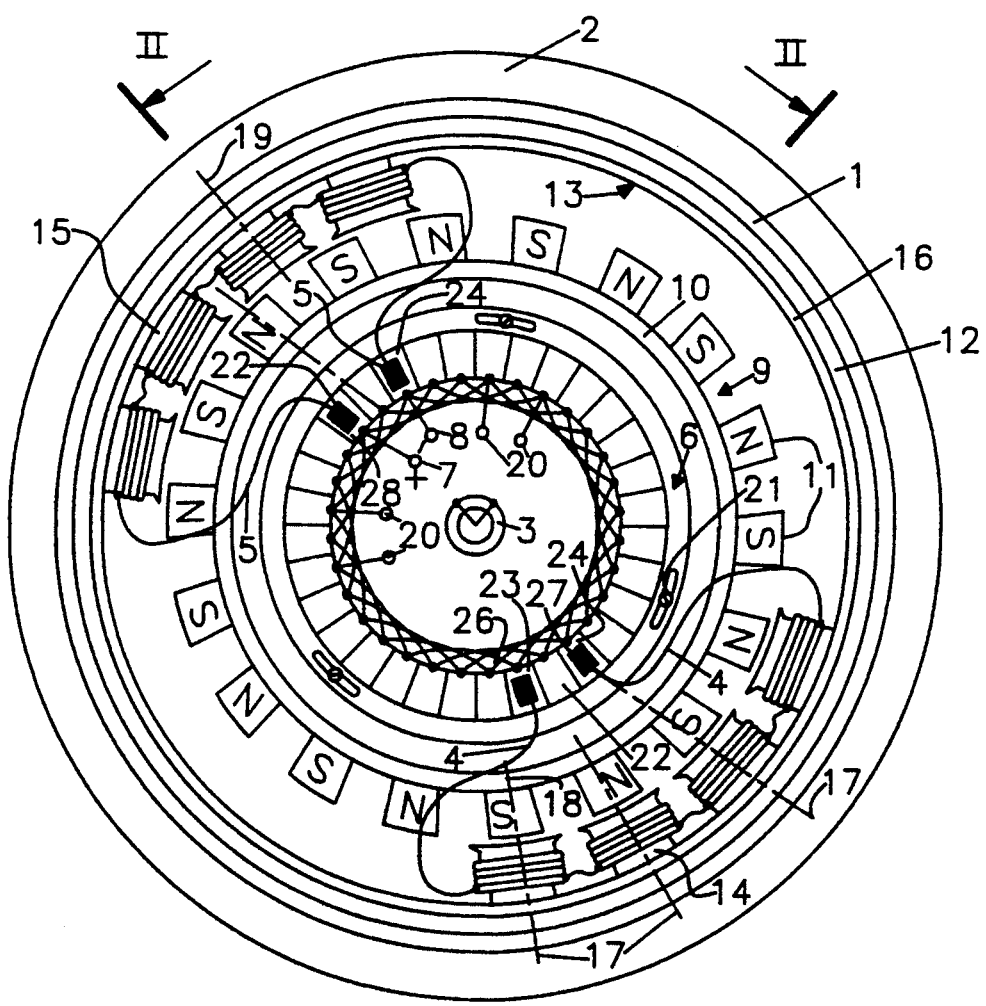
FIG. 1 is a top view of an independent-drive wheel of a wheel-mounted vehicle according to the invention.

An independent-drive wheel of a vehicle (FIG. 1) has a rim 1 which carries a tire 2 of the wheel having an axle 3.

The independent-drive wheel is based on an electric drive having a voltage control unit and an electric motor having current collectors 4 and 5 connected, via a distribution commutator 6, to leads 7 and 8 of the voltage control unit.

The independent-drive wheel comprises a stator 9 which is rigidly secured to axle 4 and which is formed by a magnetic circuit 10 having an even number of equally circumferentially spaced magnetic members 11 of the stator of alternating polarity which comprise permanent magnets.

A movable rotor 12 of a commutator electric motor is mounted on axle 3 for rotation with respect to stator 9 and has a surface 13 facing towards stator 9 which is provided with salient electromagnets 14 and 15 of the rotor connected to each other by means of a magnetic circuit 16 and on surface 13 so as to face towards magnetic members 11 of the stator for electromagnetic interaction therewith.

Rim 1 carrying wheel tire 2 is mounted on the outer surface of rotor 12.

Electromagnets 14 and 15 of the rotor are circumferentially spaced in such a manner as to form at least two groups. FIG. 1 shows two groups; a group consisting of electromagnets 14 and a group consisting of electromagnets 15. Electromagnets 14 and 15 within each group are equally spaced from one another and have alternating directions of magnetic fluxes. The groups of one pair are angularly offset with respect to each other in such a manner that when magnetic axes 17 of electromagnets 14 of the rotor of one group are aligned with axes 18 of respective magnetic members 11 of the stator, magnetic axes 19 of electromagnets 15 of the second group are not aligned with respective axes 18 of magnetic members 11 of the stator.

In a general case, for all embodiments, electromagnets 14 and 15 within each group are positioned in such a manner that their axes 17 and 19 are equally spaced from each other at distance multiple of the distance between axes 18 of two adjacent magnetic members 11 of the stator.

It should be noted that two adjacent electromagnets 14, 15 of one group have opposite polarities if the distance between their axes is equal to an odd number of times the distance between the axes of adjacent magnetic members 11 of the stator and have identical polarities if the distance between their axes is equal to an even number of times the distance between the axes of adjacent magnetic members of the stator.

Electromagnets 14, 15 of the rotor in each group are electrically coupled to their own current collector 4, 5 rigidly secured to rotor 12 and engageable with distribution commutator 6 rigidly secured to stator 9.

Distribution commutator 6 is electrically coupled to leads 20 of an electric energy storage device 32. Distribution commutator 6 is secured to the stator by means of screws 24. The distribution commutator is so constructed as to ensure disconnection of electromagnets 14 from leads 7 and 8 of the voltage control unit and connection thereof to leads 20 of the electric energy storage device when magnetic axes 17 of electromagnets 14 of the rotor of one group are aligned with axes 18 of magnetic members 11 of the stator and connection of electromagnets 15 to leads 7 and 8 of the voltage control unit and their disconnection from leads 20 of the electric energy storage device when magnetic axes 19 of electromagnets 15 of the second groups are not aligned with axes 18 of respective magnetic members 11 of the stator.

FIG. 1 shows a specific embodiment of a circuit in which an electric energy storage device is electrically coupled to distribution commutator 6 by means of equally spaced and conducting plates 22, 23, 24 radially insulated from one another. At least one intermediate plate 23 is positioned between alternating plates 22 and 24 of unlike polarity which are connected to different leads 7, 8 of the voltage control unit and is electrically coupled to leads 20 of the electric energy storage unit, radially extending axes 25 of intermediate plates 23 in this specific embodiment being aligned with axes 18 of magnetic members 11 of the stator. Members 26, 27, 28, 29 of each current collector 4, 5 have their radial axes aligned with axes 17, 19 of two adjacent electromagnets 14, 15 of a respective group of the rotor.

If there is no electric energy storage device, distribution commutator 6 is formed by equally circumferentially spaced radially insulated conducting plates 22 and 24 of unlike polarity the number of which is equal to the number of magnetic members 11 of the stator, and intermediate plates 23 are dispensed with (this is not shown in FIG. 1).

The distance between any two adjacent plates 22, 24 of unlike polarity is greater than the width of member 26, 27, 28, 29 of current collector 4 or 5.

Plates 22, 24 of unlike polarity are connected to different leads 7 and 8 of the voltage control unit.

When axes 17 of electromagnets 14 of one group are aligned with axes 18 of respective magnetic members 11 of the stator, members 26, 27 of current collector 4 of this group of electromagnets 14 are positioned intermediate between respective plates 22, 24 of unlike polarity.

In case axes 19 of electromagnets 15 of the other group are positioned intermediate between axes 18 of respective magnetic members 11 of the stator, axes of members 28, 29 of current collector 5 of this group are aligned with axes of respective plates 22, 24 of unlike polarity connected to different leads 7, 8 of the voltage control unit.

Electromagnets 14, 15 of the rotor in each group are equally spaced in such a manner that the distance between axes 17 or 19 of adjacent electromagnets 14 or 15 is equal to the distance between axes 18 of adjacent magnetic members 11 of the stator. Polarity of electromagnets 14 and 15 in each group alternates.

Figure 2:
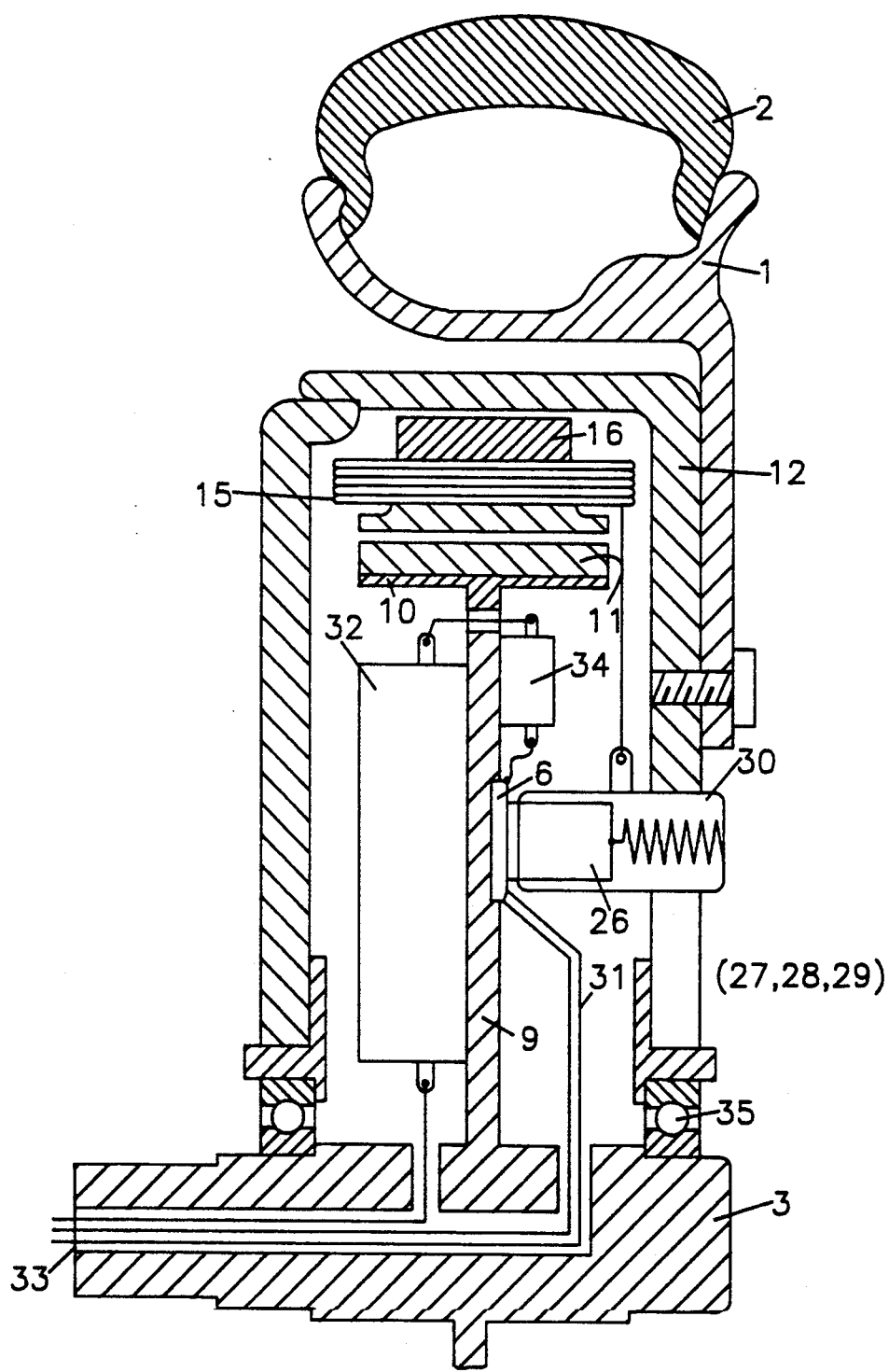
FIG. 2 a partial sectional view taken along line II—II in FIG. 1.

FIG. 2 shows current collector 5 in the form of a spring-biased carbon or copper-graphite or other brush mounted in a holder 30 of a current collector member connected to rotor 12.

A current lead 31 connects leads 7, 8 (FIG. 1) of the voltage control unit to commutator 6 (FIG. 2).

An electric energy device 32 is mounted on stator 9 adjacent to distribution commutator 6 and has leads which extend together woth current lead 31 through a passage 33 to a switch, and other leads are connected, via a rectifier converter 34, to distribution commutator 6.

Rotor 12 of the electric motor is in the form of a ring having on its external surface, rim 1 with tire 2 of the wheel and, on the inner surface, annular magnetic circuit 16 having electromagnets 14 and 15 of the rotor.

Stator 9 is in the form of a disk having annular magnetic circuit 10 mounted on its periphery and having on its outer surface facing towards the inner surface of rotor ring 12 magnetic members 11 of the stator.

Annular rotor 12 is journalled by means of a bearing 35 on axle 3 for rotation of rotor 12 with respect to stator 9.

The cores of electromagnets 14, 15 of the rotor are mounted in the immediate vicinity of magnetic members 11 of stator 9 with a gap ensuring their electromagnetic interaction.

Rotor 12 (FIG. 2) may be made in the form of at least two rings (not shown in the drawing), each of the rings carryings at least one group of electromagnets 14 or 15, current collectors 4 or 5 corresponding to these group rigidly secured to respective rings of rotor 12, a respective members 26, 27, 28, 29 of current collector 4 or 5 being engageable with distribution commutator 6.

An auxiliary distribution commutator 42, which is constructed, position and electrically coupled similarly to main commutator 6 can be provided, and auxiliary current collectors similar to current collectors 4; 5 should be provided for engagement of their members 26–29 with one of distribution commutators 42.

In addition, stator 9 may be made in the form of a plurality of disks, each having auxiliary distribution commutators 42 (not shown in the drawings).

In case a plurality of rings or rotor 12 are used, auxiliary current collectors may be provided, which are similar to current collectors 4, 5 and which are rigidly secured to respective rings of rotor 12 (not shown in the drawings).

Figure 3:
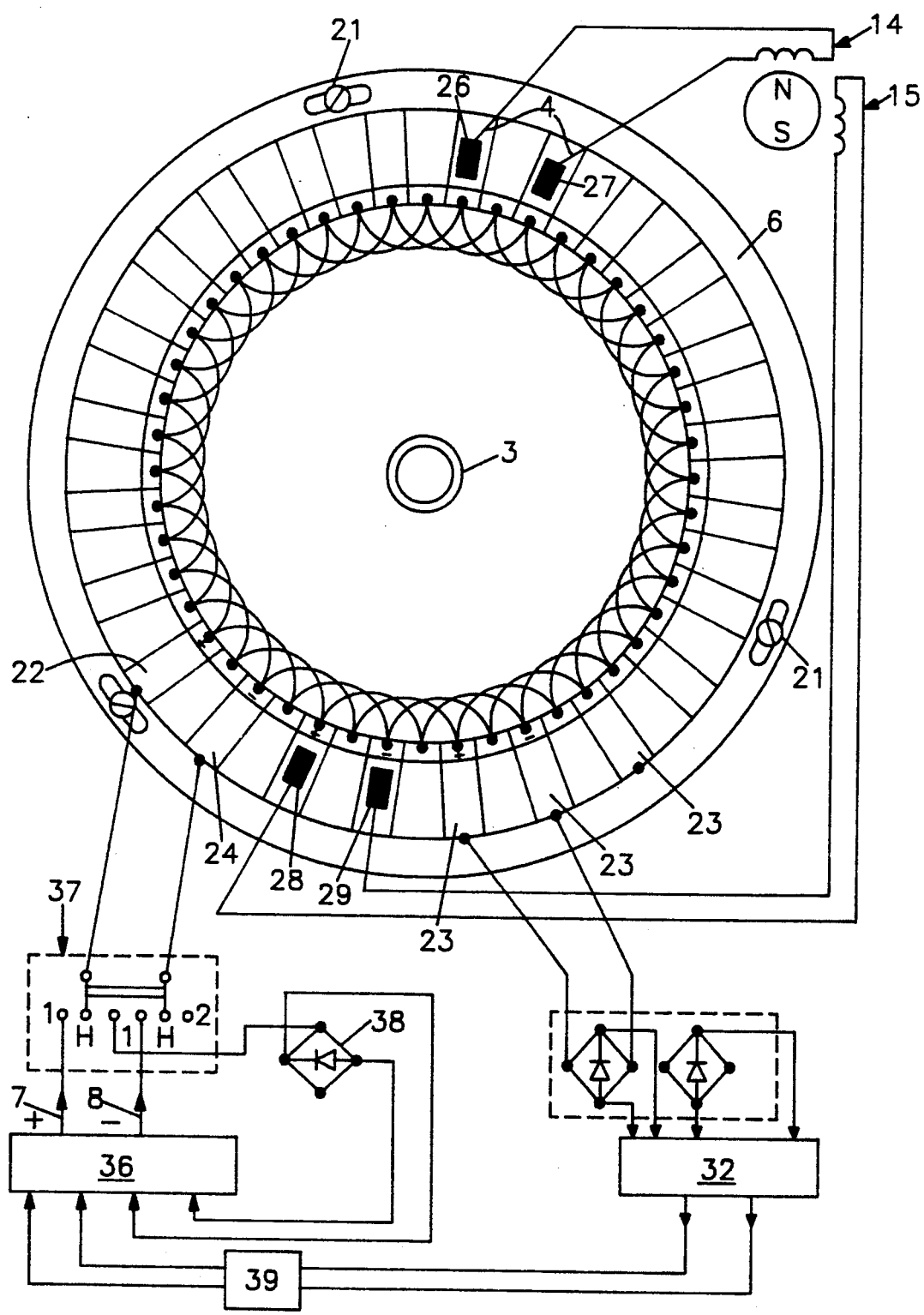
FIG. 3 is a top view illustrating a distribution commutator showing an embodiment of a rotor and stator of an electric motor and an electric circuit for connecting the electric motor to a voltage control unit and to an electric energy storage device according to the invention.

FIG. 3 shows a circuit illustrating connection of distribution commutator 6 to a voltage control unit 36 and to electric energy storage device 32.

Members 26, 27 of current collector 4 are connected to series-opposition connected coils of electromagnets 14 of the first group and members 28, 29 are connected to coils of electromagnets of the second group.

Leads 7 and 8 of voltage control unit 36 are connected, via a switch 37, to plates 22, 24 of unlike polarity.

Switch 37 has two positions: position 1 for "movement" and position 2 for "Braking". In position 2, plates 22, 24 are connected, via a rectifier converter 38, to voltage control unit 36 for recharging during braking.

Intermediate plates 23 are connected, via rectifier converter 34, to inputs of electric energy storage device 32 which is in the form of an electrolytic capacitor having its leads connected, via an electronic switch 39, to voltage control unit 36 for its recharging during movement of the vehicle.

Figure 4:
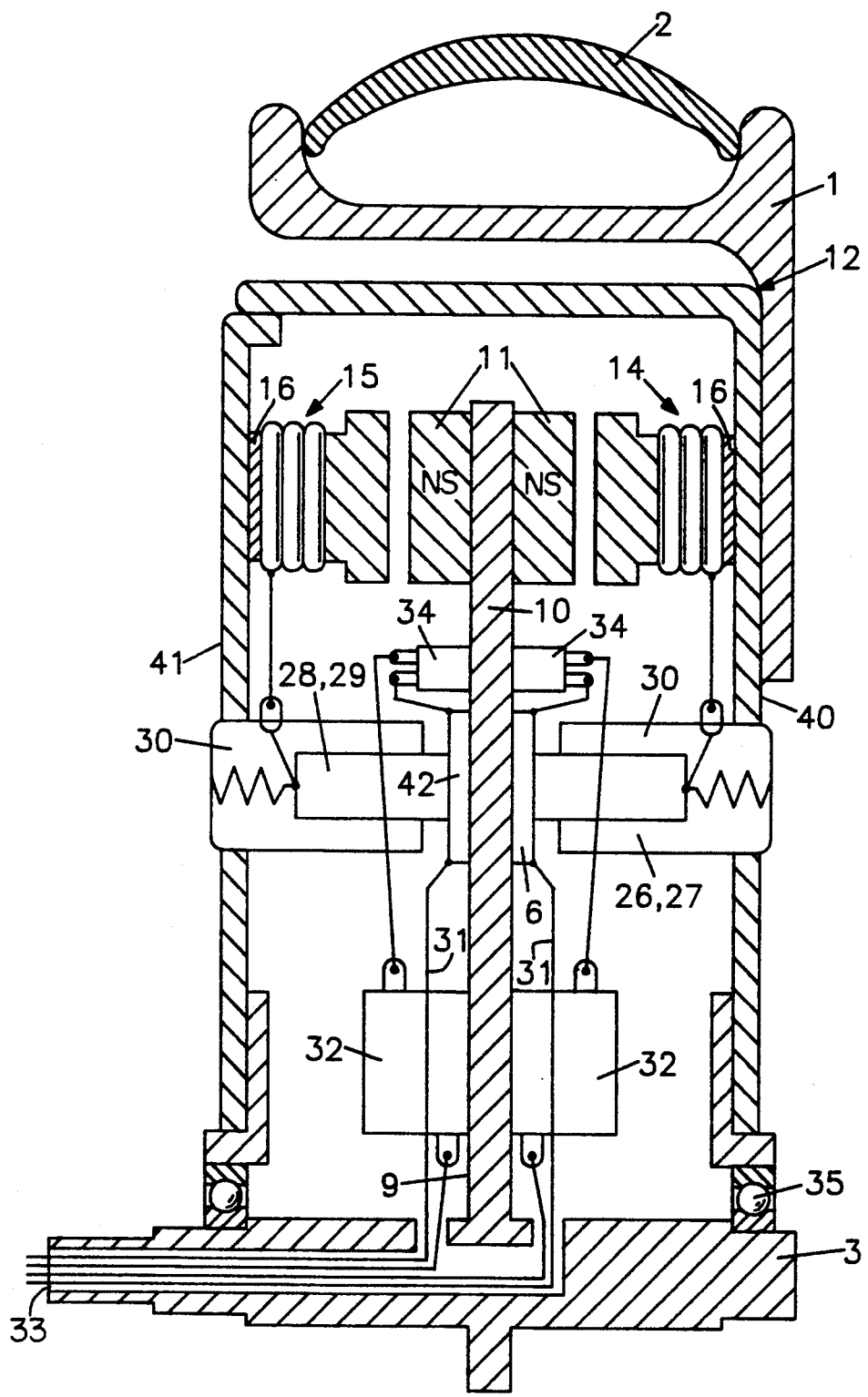
FIG. 4 is a sectional view of an independent-drive wheel showing another embodiment of a rotor and stator of an electric motor according to the invention.

FIG. 4 shows rotor 12 of the electric motor in the form of a pair of disks 40, 41 mounted on axle 3 symetrically with respect to stator 9 which is in the form of a disk and which has auxiliary distribution commutator 42 similar to the above-described main commutator, and each of distribution commutators 6, 42-distribution commutator 6 and auxiliary distribution commutator 42 is mounted on the side of the disk of stator 9 facing towards a respective side of respective disk 40, 41 of the rotor.

Electromagnets 14, 15 of one group of a pair of groups of the electromagnets are provided on each of disks 40, 41 of rotor 12, electromagnets 14 being mounted on disk of rotor 12 and electromagnets 15 being mounted on disk 41.

Magnetic members 11 of the stator mounted on either side of the disk of stator 9 in accordance with positions of main distribution commutator 6 and auxiliary commutator 42 are in the form of permanent magnets.

Figure 5:
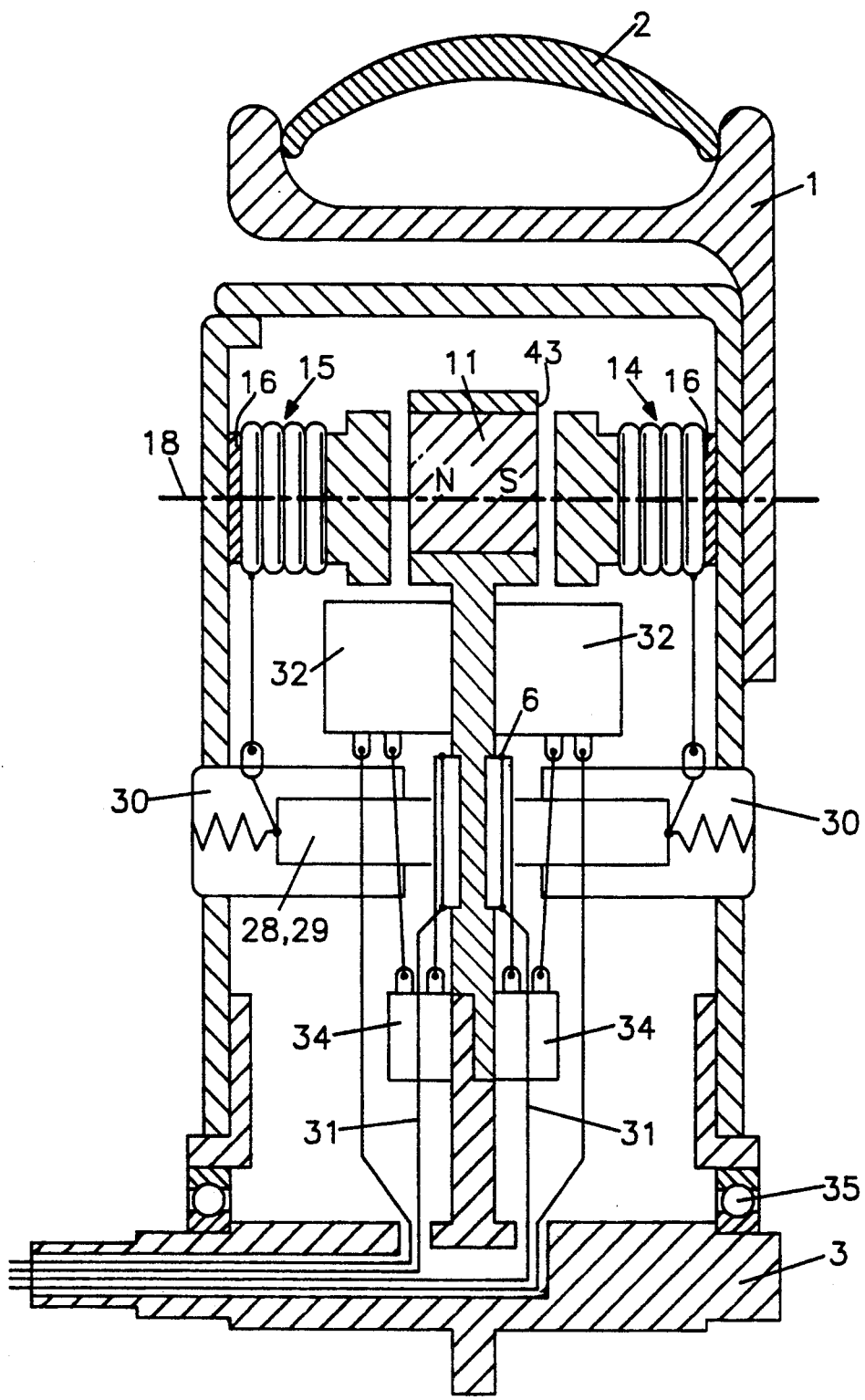
FIG. 5 is a sectional view of an independent-drive wheel showing an embodiment of a rotor and stator of FIG. 4 with a different position of magnetic members of the stator according to the invention.

FIG. 5 shows an independent-drive wheel in which equally spaced grooves 43 are made in the periphery of the disk of stator 9, and alternating permanent magnets 11 with opposite directions of magnetic flux running in parallel with wheel axle 3 are received in these grooves.

Figure 6:
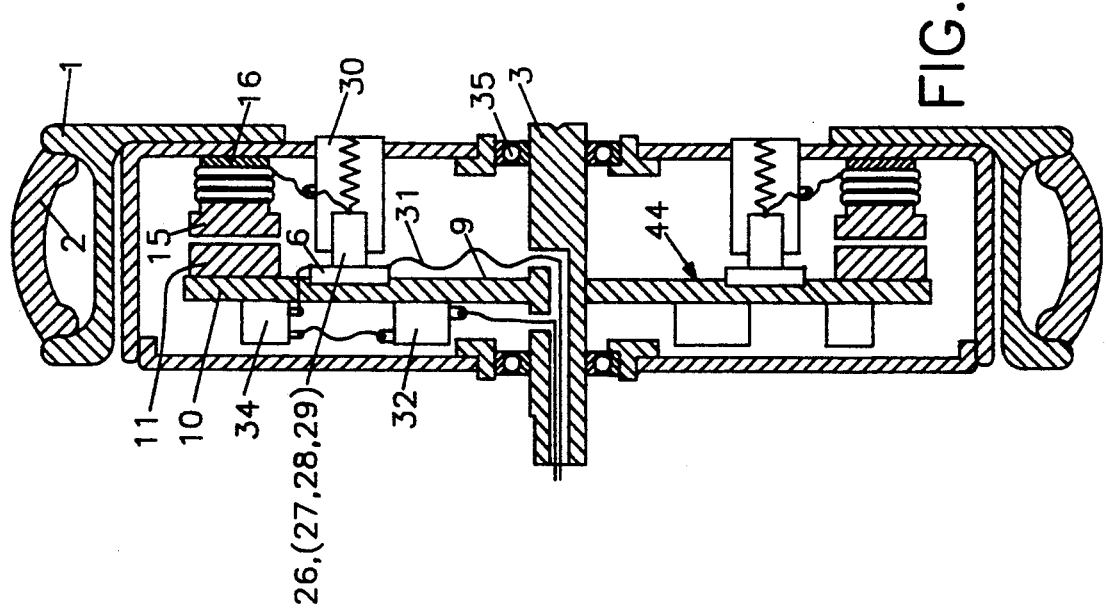
FIG. 6 is a sectional view of an independent-drive wheel showing still another embodiment of a rotor and stator with a different position of magnetic members of the stator according to the invention.

FIG. 6 shows still another embodiment of stator 9 and rotor 12 in which the stator and rotor are each in the form of a disk, permanent magnets 11 having alternating poles along the circumference (with opposite directions of magnetic fluxes running in parallel with wheel axle 3) being positioned along the periphery of the disk of stator 9 on the side of a surface 44 of the stator gacing towards electromagnets 14, 15 of the rotor.

Figure 7:
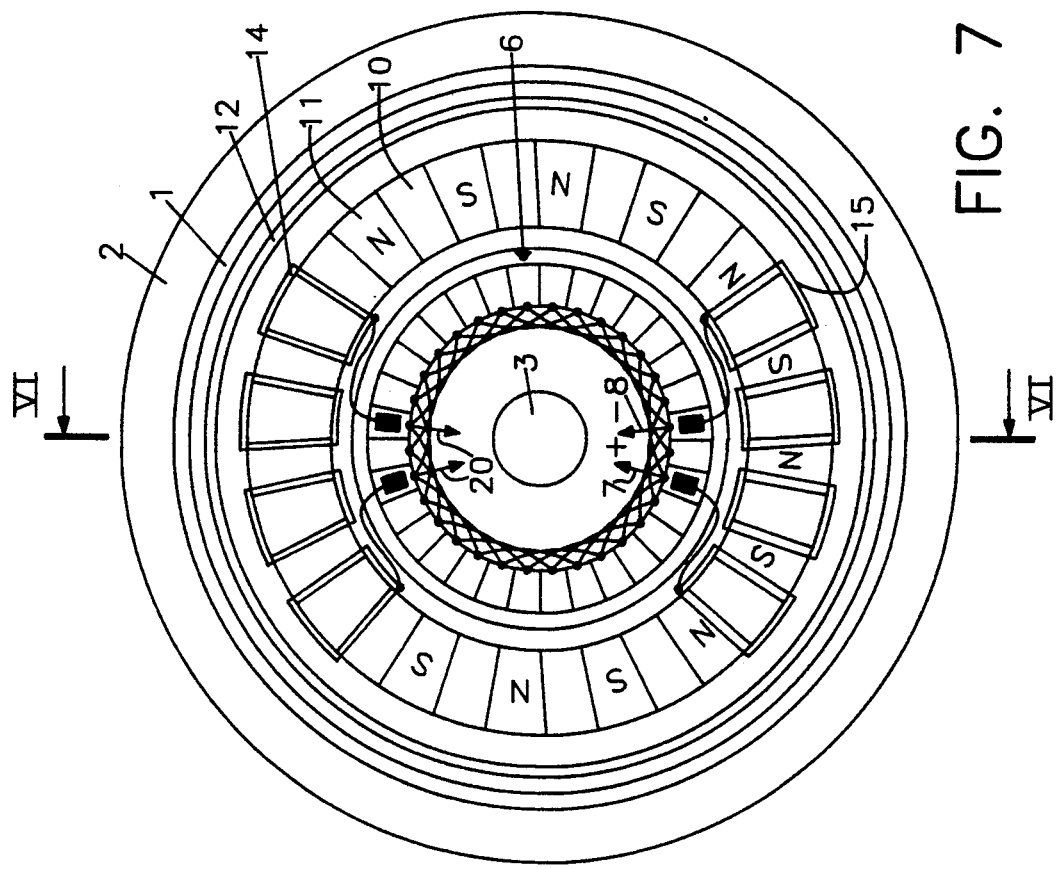
FIG. 7 is a top view of the embodiment shown in FIG. 6.

In FIG. 7 the lines interconnecting two adjacent permanent magnets 11 show the lines of magnetic flux.

Figure 8:
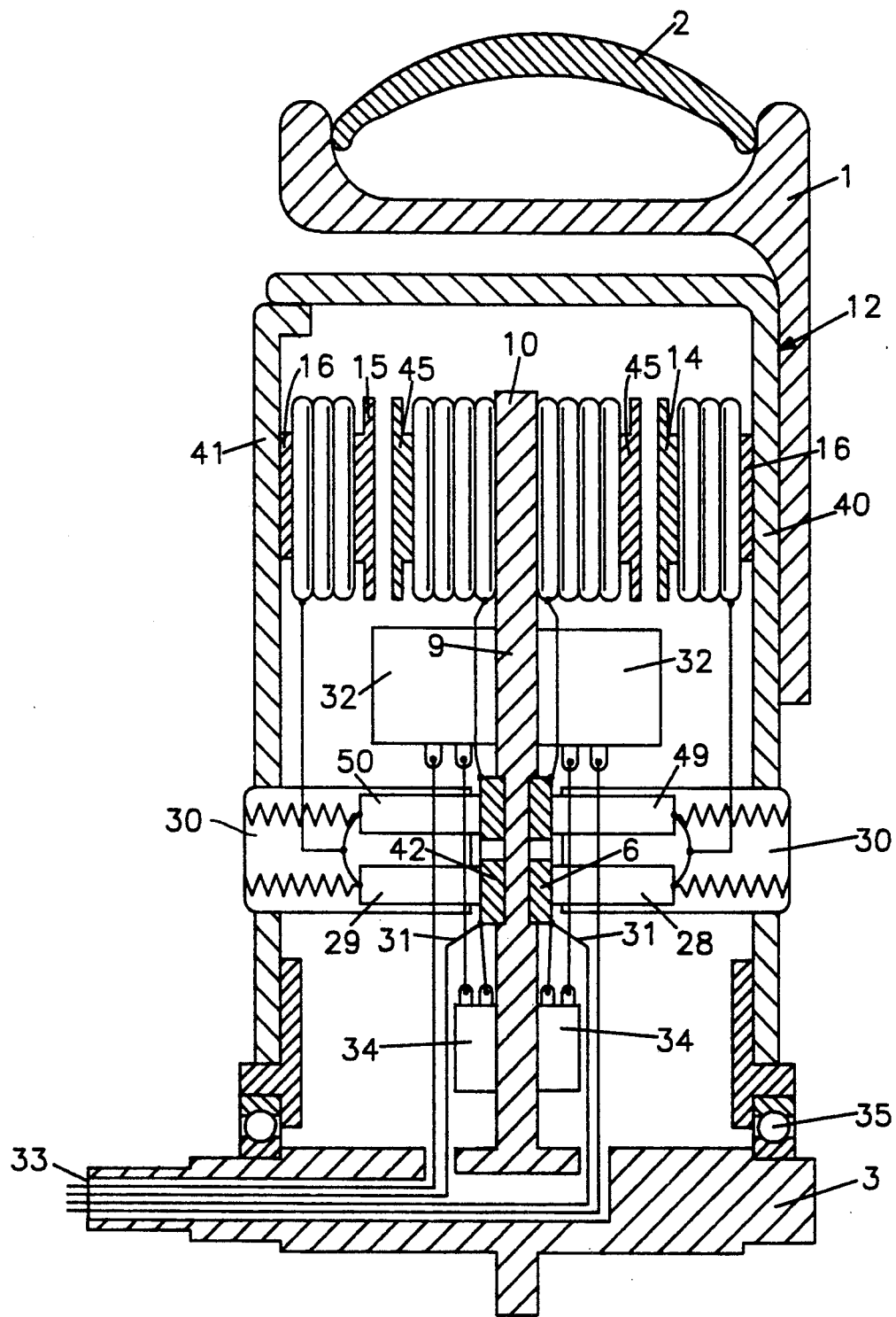
FIG. 8 is a sectional view of an independent-drive wheel showing an embodiment of a rotor and stator of FIG. 4 with a different position and construction of magnetic members of the stator and with a different distribution commutator according to the invention.
Figure 9:
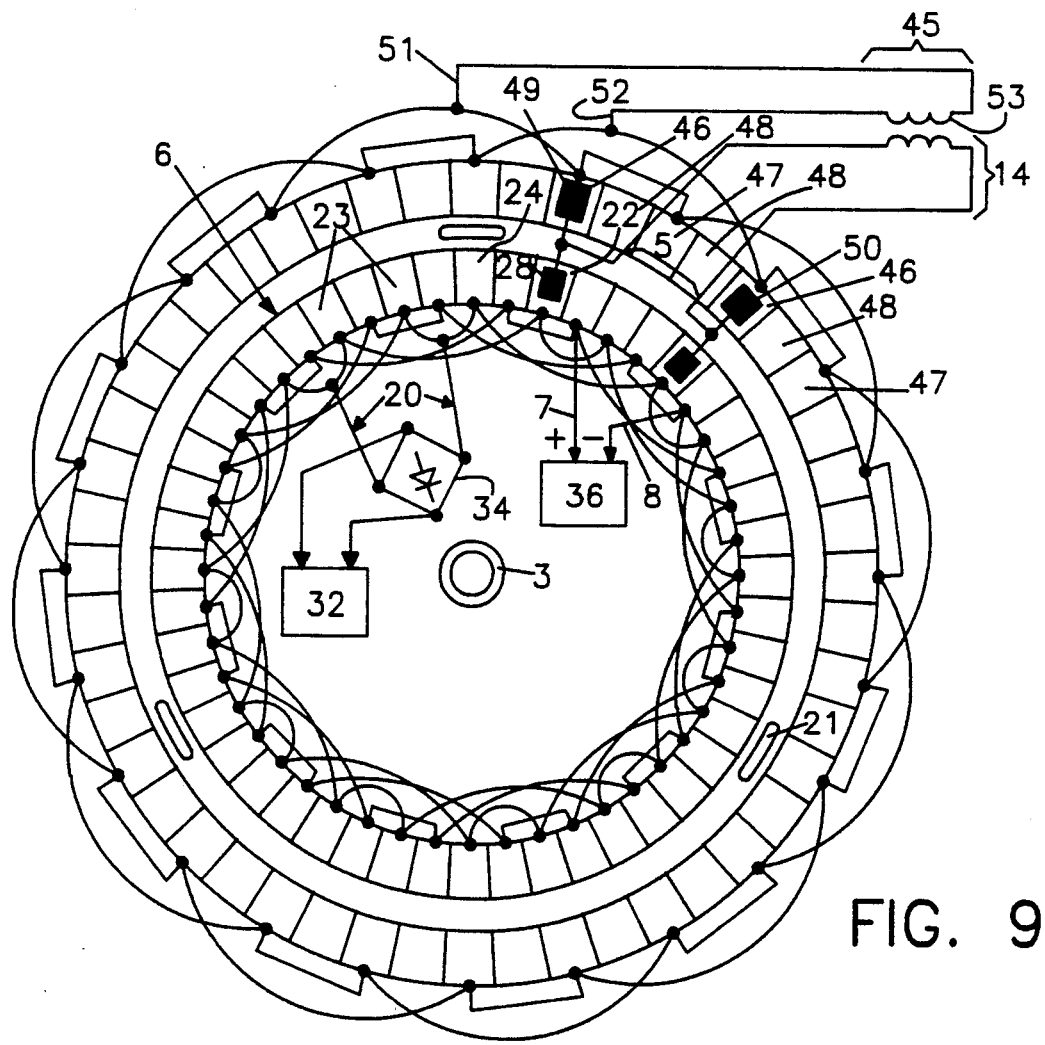
FIG. 9 is a schematic view showing a distribution commutator of FIG. 8 (a top view) and its connection to a voltage control unit, electric energy storage device and coils of the rotor and stator electromagnets according to the invention.

FIG. 8 shows a sectional view of an independent-drive wheel with an embodiment of rotor 12 and stator 9 as shown in FIG. 4, wherein magnetic members provided on either side of the disk of stator 9 (FIG. 7) facing towards disks 40, 41 of rotor 12 are in the form of electromagnets 45 of the stator having alternating oppositely directed magnetic fluxes. Each distribution commutator 6 (42) corresponding to a given side of the disk of stator 9 (FIG. 9) is provided with auxiliary conducting plates of unlike polarity 46, 47 (FIG. 9) similar to main plates 22, 24 of unlike polarity and with auxiliary intermediate plates 48 similar to main intermediate plates 23 radially extending within a circle of a different diameter. Each (main) member of a respective current collector 5 (4) designed for engaging main conducting plates 22, 24 of distribution commutator 6 is provided with an auxiliary (current collector) member 49, 50 electrically connected to respective main member 28, 29 and positioned with respect to auxiliary plates 46, 48 in a manner similar to the manner in which main current collector member 28, 29 is positioned with respect to main conducting plates 22, 24, the auxiliary plates 46, 48 of unlike polarity being connected to each other pairwise, and each of the alternating pairs of auxiliary plates 46, 47 being electrically connected to a respective common lead 51, 52 of coils 53 of electromagnets 45 of the stator.

Figure 10:
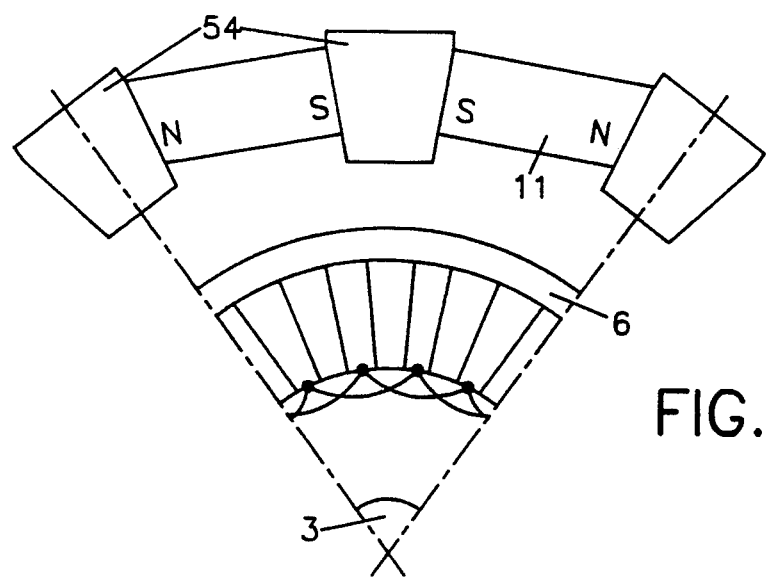
FIG. 10 is a fragmentary view of a stator of FIG. 1 showing an embodiment of construction and position of magnetic members of the stator according to the invention (a top view)

FIG. 10 shows a fragmentary view of a stator illustrating the tangential position of magnetic members 11 of the stator between concentrators 54.

Figure 11:
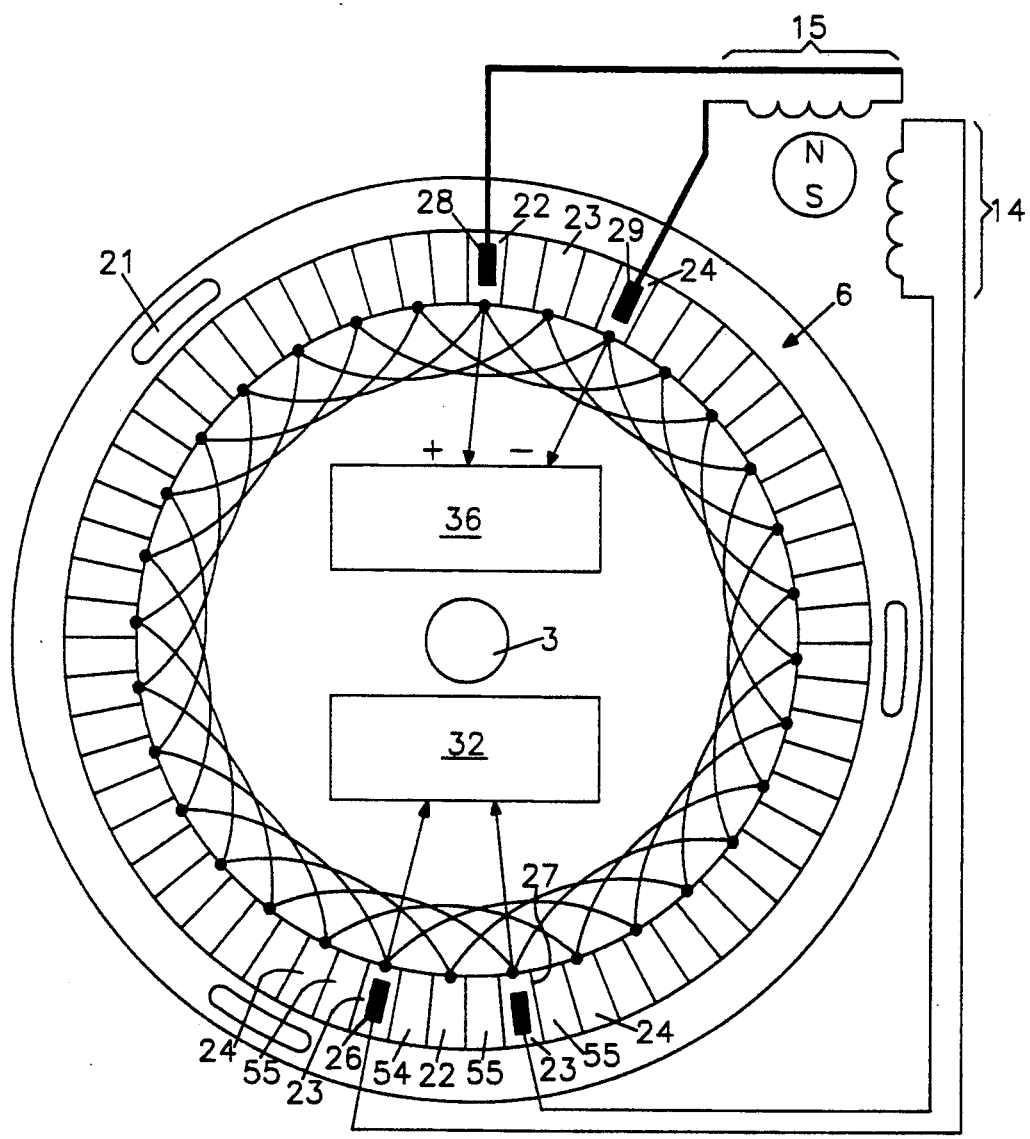
FIG. 11 is a schematic representation of a distribution commutator of FIG. 3 (a top view) with a different construction and position of plates showing its connection to a voltage control unit, electric energy storage device, and coils of the rotor electromagnets according to the invention.

FIG. 11 shows a commutator having idle plates 55 provided between each plate of unlike polarity and intermediate plate. This construction of the distribution commutator ensures the absence of any electrical interaction between plates of unlike polarity and intermediate plates 22, 23, 24 if they are mutually covered by current collector members 26, 27, 28, 29 so as to lower loss currents and enhance economic performance although with an increased probability of sparking.

Operation of all embodiments ff an independent-drive wheel is determined by forces of electromagnetic attraction and repulsion developed when electromagnets 14, 15 (FIG. 1) of the rotor interact with magnetic members 11 of the stator. When electromagnet 15 of the rotor is in a position in which its axis 19 is located intermediate between axes 18 of adjacent magnetic members 11 of the stator, the coil of electromagnet 15 of the rotor is energized in such a manner that a magnetic pole opposite to a pole of the next magnetic member 11 of the stator in the direction of rotation and identical to the pole of the preceding magnetic member 11 of the stator in the direction of rotation is formed in the surface of electromagnet 15 facing towards stator 9. This ensures the attraction of electromagnet 15 to the next magnetic member 11 and, at the same time, its repulsion from the preceding magnetic member.

When electromagnet 15 is located opposite to magnetic member 11 of the stator, the electromagnet coil is not connected to voltage control unit 36 (FIG. 3), i.e., no forces of electromagnetic interaction are developed (although there is likely to be a slight attraction of the core of electromagnet 15 (FIG. 1) to magnetic member 11 of the stator).

After passage by the next magnetic member 11 of the stator, members 26,27,28,29 of current collectors 4, 5 slide over plates 22,24 of unlike polarity which are connected to different leads 7,8 of voltage control unit 36 (FIG. 3), and an opposite pole (with respect to that formed when electromagnet 14,15 was located upstream this magnetic member 11 in the direction of rotation) is formed on the surface of electromagnet 14, 15 (FIG. 1). This is necessary as magnetic members 11 of the stator alternate.

If intermediate plates 23 are provided, when electromagnets 14,15 are located in front of magnetic members 11, emf is induced in the coils of electromagnets 14,15 owing to a change in magnetic flux in the core of electromagnet 14,15 and because of a change in residual magnetization, and this emf will charge, in a pulsed manner, electric energy storage device 32.

The independent-drive wheel (FIGS. 1 and 3) functions in the following manner.

When voltage is supplied to distribution commutator 6 from voltage control unit 36 (position "1" of switch 37), one of the groups of electromagnets, namely, group of electromagnets 15 having their meads connected to members 28 and 29 of the current collector electrically engageable with plates 22 and 24 of unlike polarity connected, via switch 37, to leads 7 and 8 of unit 36, electromagnetically interacts with respective magnetic members 11 of the stator (between which they are located). Electromagnets 15 are repelled from the preceding magnetic members 11 of the stator and are attracted to the next magnetic members 11 of the stator (in the direction of rotation) to produce a respective torque.

At the same time, electromagnets 14 of the other group (groups) do not electromagnetically interact with magnetic members of the stator and do not generate torque because their coils are deenergized. Current does not flow in the coils of electromagnets 14 because members 26,27 if current collector 4 of this group engages intermediate plates 23 which are not connected to unit 36.

As long as members 28,29 of current collector 5 of one group of electromagnets 15 engage plates 22 and 24 of unlike polarity, the electromagnetic interaction with magnetic members 11 of the stator continues to produce torque. When members 28 and 29 engage intermediate plates 23 (the electromagnets are located in front of the magnetic members), the coils of respective electromagnets 15 are deenergized. However, rotation is not interrupted, nor is it decelerated since members 26 and 27 of current collector 4 of the group of electromagnets 14 are already in front of plates 22 and 24 of unlike polarity (owing to a relatively offset position of electromagnets 14,15) so as to ensure electromagnetic interaction of electromagnets 14 with magnetic members 11 of the stator and rotation of the rotor.

In a general case, with "m" groups of electromagnets of the rotor, the coils of up to "(m−1)" groups of electromagnets can be energized to produce torque at every given moment.

When electromagnets 14,15 of any group are in front of magnetic members 11 of the stator, members 26,27 or 28,29 of current collector 4 or 5 of this group are in front of intermediate plates 23 which are connected, via rectifier converter 34 (FIG. 3), to electric energy storage device 32. Owing to a change in magnetic flux in the cores of electromagnets 14,15, emp charging storage device 32 is induced in the coils during rotation of the rotor. This ensures recuperation of electric energy in at least one of the "m" groups of electromagnets during movement.

In addition, during braking, by putting switch 37 (FIG. 3) to position "2", recuperation can also be effected in a similar manner from the rest of the groups of electromagnets through rectifier converter 38, e.g., directly to voltage control unit 36. In addition to recuperation, a highly-efficient electromagnetic braking is thereby ensured owing to the induction of emp in all coils of electromagnets 14,15 rotating with respect to magnetic members 11 of the stator.

The provision of electromagnets 45 (FIGS. 8 and 9) of stator 9 represents a further development of the above-described embodiments. This independent-drive wheel functions in the following manner.

The coils of electromagnets 14,15 of the rotor (FIG. 9) are energized as described above: when members 28 and 29 of current collector 5 are located opposite to plates 22 and 24, voltage from voltage control unit 36 is supplied through plates 22 and 24 of unlike polarity of electromagnets 14. At the same time, voltage from members 28 and 29 of current collector 5 is supplied to auxiliary members 49 and 50 of the same current collector which are located opposite to plates 46,47 of unlike polarity of distribution commutator 6. The respective voltage is thus fed to coils 53 of electromagnets 45 of the stator so as to ensure the desired electromagnetic interaction. When members 28, 29 of current collector 5 are located in front of intermediate plates 23, the above-described recuperation process occurs. In spite of the uniformity of distribution of electromagnets 45 of the stator and rotor, when members 26,27,28,29 of current collectors 4,5 are located in front of intermediate plates 23,48, there is no deceleration of movement.

Industrial Applicability

The independent-drive wheel can be used in various vehicles.

When used in wheel chairs, it is expedient to make use of two independent-drive wheels. Voltage is 24 V (two storage batteries of 12 V). Average working current is 6 A. Power input of each wheel is 60 W, speed is 8 km/h. Load carrying capacity is 100 kg. The range of travel without recharging is 80 to 140 km.

When used in electrical bicycles, it is expedient to use a single independent-drive wheel. Voltage is 48 V (four storage batteries of 12 V). Average working current is 5 A. Power input is 220 W. Speed is 50 km/h. Load carrying capacity is 100 kg. The range of travel without recharging is 90 to 150 km.

When used on a minitractor, it is preferred that four independent-drive wheels be used. Voltage is 24 V (two storage batteries of 12 V). Average working current is 28 A. Power input is 670 W. Speed is 20 km/h. The range of travel without recharging is 60 to 80 km depending on the storage battery type.

When used in an electric car (interplant materials handling), two independent-drive wheels are used. Voltage is 24 V (two storage batteries of 12 V). Average working current is 22 A. Power input is 250 W per wheel, speed is 25 km/h. Load carrying capacity is 300 kg. The range is 30 to 50 km depending on the storage battery type.

When used in a two-seat electric car of urban type, two independent-drive wheels are preferably used. Voltage is 48 V (four storage batteries of 12 V). Average working current is 16 A. Power input is 380 W per wheel, speed is 90 km/h. Load carrying capacity is 250 kg. The range of travel without recharging is 300 to 500 km.

I claim:

1. An independent-drive wheel mechanism of a motor vehicle having a rim (1), an axle (3) an electric drive means comprising an electric motor and a voltage control unit (36), said electric motor comprising a stator (9) rigidly secured to the axle having a first magnetic circuit (10) and which supports an even number of equally circumferentially spaced magnetic members (11) having alternating polarity, and a rotor (12) having a second magnetic circuit (16) is mounted on the wheel axle (3), is rotatable with respect to the stator (9) and supports the rim (1) said second magnetic circuit (16) comprising windings made with salient electromagnets (14,15) facing towards the magnetic members (11) which are spaced along the circumference in the form of at least two groups and which are positioned, within each group, in such a manner that their axes (17,19) are spaced from each other at distances which are a multiple of the distance between the axes (18) of two adjacent magnetic members (11) of the stator, wherein any two adjacent electromagnets (14,15) of one group have opposite polarities where the distance between their axes (17,19) is equal to an even number of times the distance between the axes (18) of the adjacent magnetic members (11) of the stator and any two adjacent electromagnets (14,15) of one group have identical polarities where the distance between their axes (17,19) is equal to an even number of times the distance between the axis (18) of the adjacent magnetic members (11) of the stator, two groups of the electromagnets (14,15) of the rotor are offset at an angle with respect to one another in such a manner that when the axes (17) of the electromagnets (14) of the rotor of one group are aligned with axes (18) of the respective magnetic members (11) of the stator, the axes (19) of the electromagnets (15) of other groups are not aligned with axes (18) of the respective magnetic members (11) of the stator, the electromagnets (14,15) within each group of the rotor being electrically connected to members (26,27,28,29) of individual current collectors (4,5) rigidly secured to the rotor (12), the member (26,27,28,29) of the current collectors (4,5) being engageable with a distribution commutator (6) which is electrically coupled to the voltage control unit (36) which is mounted on the stator and is so constructed that when the axes (17) of the electromagnets (11) of any one of the groups are aligned with the axes (18) of respective magnetic members (11) of the stator, the electromagnets (14) of this group are disconnected from the voltage control unit (36).

2. An independent-drive wheel mechanism according to claim 1, wherein the distribution commutator (6) comprises equally circumferentially spaced conduction plates (22,24) of unlike polarity radially insulated relative to each other, the number of plates being equal to the number of the magnetic members (11) of the stator any the distance between and two adjacent plates (22,24) of unlike polarity being greater than the width of the current collector member (26,27,28,29) wherein the plates of unlike polarity (22,24) are alternately connected to different leads of the voltage control unit (36), whereby when the axes (17) of the electromagnets (14) of any one group are aligned with the axes (18) of respective magnetic members (11) of the stator, the current collector (4) members (26,27) of said any one group are located intermediate between the respective plates (22,24) of unlike polarity and when the axes (19) of the electromagnets (15) of any group are located intermediate between the axes (18) of the respective magnetic members (11) of the stator, the axes of the current collector (5) members (28,29) of said any one group are aligned with the axes of the respective plates (22,24) of unlike polarity connected to different leads (7,8) of the voltage control unit (36).

3. An independent-drive wheel mechanism according to claim 2, wherein the electromagnets (14,15) of the rotor (12) of each group are equally spaced in such a manner that the distance between the axes (17 or 19) of electromagnets (14 or 15) is equal to the distance between the axes (18) of the adjacent magnetic members (11) of the stator (9), the electromagnets (14 or 15) within each group being of alternating polarity.

4. An independent-drive wheel mechanism as claimed in claim 1, wherein an electric energy storage device (32) is electrically coupled to the distribution commutator (6), the distribution commutator (6) being constructed in such a manner that when the axes (17) of the electromagnets (14) of any one group are aligned with the axes (18) of the magnetic members (11) of the stator (9), the electromagnets (14) are disconnected from the voltage control unit (36) and connected to the electric energy storage device (32) and when the axes (19) of the electromagnets (15) of any group are not aligned with the axes (18) of the magnetic members (11) of the stator (9), the electromagnets (15) are connected to the voltage control unit (36) and are disconnected from the electric energy storage device (32).

5. An independent-drive wheel mechanism as claimed in claim 4, wherein the electric energy storage (32) device is electrically coupled to the distribution commutator (6) which is formed by equally spaced conducting plates (22,24) of unlike polarity which are insulated from each other the number of plates being equal to the number of the magnetic members (11) of the stator, one intermediate plate (23) being provided between alternating plates (22,24) of unlike polarity connected to different leads (7,8) of the voltage control unit (36), the intermediate plates (23) being alternately connected to different leads (20) of the electric energy storage device (32), the distance between any two adjacent plates (22,24) of unlike polarity being greater than the width of the current collector members (26,27,28,29), and when the axes (17) of the electromagnets (14) of any one group are aligned with the axes (18) of the respective magnetic members (11) of the stator (9), the current collector members (26,27) of said any one group (14) of the electromagnets of the rotor (12) are aligned with the centerline of the respective intermediate plates (23) connected to different leads (20) of the electric energy storage device (32), and when the axes (19) of the electromagnets (15) of any one group are located intermediate between the axes (18) of the respective magnetic members (11) of the stator (9), the axes of the current collector members (28,29) of this groups are aligned with the axes of the respective plates (22,24) of unlike polarity connected to different leads (7,8) of the voltage control unit (36).

6. An independent-drive wheel mechanism according to claim 2 wherein the rotor of the electric motor comprise at least one ring having a magnetic circuit (16), and groups of electromagnets (14,15) of the rotor are provided on the inner surface of the rotor magnetic circuit, the stator (9) comprising at least one disk having an annular magnetic circuit (10) provided on the periphery of each disk and having on its outer surface the magnetic members of the stator, the axes (17,19) of the electromagnets (14,15) of the rotor (12) and magnetic members (11) of the stator (9) extending in the radial direction.

7. An independent-drive wheel mechanism according to claim 2 wherein the rotor (12) comprise at least one disk mounted on the wheel axle (3) on one side of the stator (9) which is in the form of a disk, the magnetic members (11) of the stator being spaced along the circumference on one side of the stator (9) disk in such a manner that their magnetic axes (18) run in parallel with the wheel axle (3).

8. An independent-drive wheel mechanism according to claim 7, wherein the rotor (12) comprises two disks (40,41) mounted on the wheel axle (3) on either side of the stator (9), each rotor disk (40,41) carrying at least one group of electromagnets (14,5).

9. An independent-drive wheel mechanism according to claim 2, wherein the rotor (12) comprises a pair of disks (40,41) mounted on the wheel axle (3) on either side of the stator (9) which is in the form of a disk having the magnetic members (11) of the stator provided on both sides thereof along the circumference in such a manner that their magnetic axes (18) run in parallel with the wheel axle (3), the stator (9) being provided with an auxiliary distribution commutator (42) which is constructed, positioned and electrically connected similarly to main distribution commutator (6), each disk (40,41) of the rotor (12) carrying at least one group of electromagnets (14,15) the current collector members (26,27) of one of the rotor (12) disks (40) being mounted for electric contact with the main distribution commutator (6) and the current collector members (28,29) of the other disk (4) of the rotor (12) being mounted for electric contact with the auxiliary distribution commutator (42).

10. An independent-drive wheel mechanism according to claim 6, wherein the rotor (12) comprise at least two rings, each ring carrying at least one group of electromagnets (14,15) and current collectors similar to the current collectors (4,5) rigidly secured to the respective ring of the rotor (12).

11. An independent-drive wheel mechanism according to claim 10 wherein each auxiliary current collector has its members (26,27,28,29) engageable with the distribution commutator (6).

12. An independent-drive wheel mechanism according to claim 10 further comprising at least one auxiliary distribution commutator (42) which is constructed, positioned and electrically connected similarly to the distribution commutator (6), the auxiliary current collectors (42) having their members (26,27,28,29) engageable with one of the auxiliary distribution collectors (42).

13. An independent-drive wheel mechanism according to claim 10 comprising at least one auxiliary distribution commutator (42) which is constructed and electrically connected similarly to the main distribution commutator (6) said stator comprising at least two coaxially disks, the auxiliary distribution commutator (42) being provided on the lateral sides of the respective disks of the stator (9)) and the members of the auxiliary current collectors being mounted for electric contact with the respective auxiliary distribution commutator (42).

14. An independent-drive wheel mechanism according to claim 10, wherein magnetic members are provided on each side of the stator (9) disk facing towards the disks (40,41) of the rotor and comprise an even number of electromagnets (45) having alternating magnetic poles, each commutator (6,42) having auxiliary conducting plates (46,47) of unlike polarity and auxiliary intermediate plates (48) similar to the main plates of unlike polarity and main intermediate plates, insulated therefrom and similarly positioned within a circle of a different diameter, each respective current collector member (26,27,28,29) having an auxiliary current collector member (49,50) electrically connected to the respective main current collector member and mounted with respect to the auxiliary conducting plates (46,47) similarly to the manner in which the main current collector members (26,27,28,29) is mounted to the main conducting plates (22,24) the auxiliary plates (46,47) of unlike polarity, and each of the alternating pairs of the auxiliary plates of unlike polarity being electrically connected to the respective lead (51,52) of the electromagnets (53) of the stator, the main plates (2,24) of unlike polarity being divided into pairs formed by two adjacent plates (22,24) of unlike polarity which are electrically connected to each other, and each of the alternating pairs of the main plates (22,24) of unlike polarity being electrically connected to the respective lead (7,3) of the voltage control unit (36), each disk (40,41) of the rotor carrying a respective one group of electromagnets (14,15) of the rotor.

15. An independent-drive wheel mechanism according to claim 2 wherein the magnetic members (11) of the stator comprise permanent magnets.

16. An independent-drive wheel mechanism according to claim 8, wherein equally spaced grooves (43) are made in the periphery of the stator disk, and permanent magnets with alternating poles having the axes (18) of their magnetic fluxes running in parallel with the wheel axle (3) are received in these grooves.

17. An independent-drive wheel mechanism according to claim 2 further comprising magnetic flux concentrators, said alternating magnetic members (11) of the stator being provided along the periphery of the stator (9) disk in such a manner that the direction of the magnetic flux is tangential with respect to the circumference of the disk between the concentrators (54).

18. An independent-drive wheel mechanism according to claim 2 wherein the distribution commutator (6,42) is rotatably mounted on the stator (9) for angular rotation with respect to the axis of the stator (9).

19. An independent-drive wheel mechanism according to claim 4 further comprising idle plates (55) between plates of unlike polarity and intermediate plates (22,23,24,46,47,48) of the distribution commutator (6).

20. An independent-drive wheel mechanism according to claim 2 further comprising idle plates (55) provided between plates (46,47,48) of unlike polarity and intermediate plates of distribution commutator (42).

21. An independent-drive wheel mechanism according to claim 1 wherein one of several groups of the electromagnets (14 or 15) of the rotor are divided into subgroups, the electromagnets within each subgroup being equally spaced along the circumference in accordance with the distance between the adjacent magnetic members (11) of the stator, each subgroup having an auxiliary current collector which has its members mounted for electric contact with the distribution commutator (6) or with the distribution commutator (42).

22. An independent-drive wheel mechanism according to claim 5 wherein the intermediate plates (23,48) of the distribution commutator (6) and/or commutator (42) are connected to the electric energy storage device (32) via a rectifier converter (34).

23. An independent-drive wheel mechanism according to claim 2 comprising a switch (37) for switching two channels to one, the leads (7,8) of the voltage control unit (36) being connected to first inputs of the switch (37) having its outputs connected to the plates (22,24,46,47) of unlike polarity of the distribution (42), respectively, and second inputs connected, via a rectifier converter (38), to inputs of the voltage control unit (36), or of the electric energy storage device (32), or of an auxiliary electric energy storage device.

* * * * *